Aug. 9, 1927.

E. C. WENTE 1,638,555

TRANSLATING DEVICE

Filed May 1, 1923

Inventor:
Edward C. Wente
by Jno. C. R. Palmer Att'y.

Patented Aug. 9, 1927.

1,638,555

UNITED STATES PATENT OFFICE.

EDWARD C. WENTE, OF NEW YORK, N. Y., ASSIGNOR TO WESTERN ELECTRIC COMPANY, INCORPORATED, OF NEW YORK, N. Y., A CORPORATION OF NEW YORK.

TRANSLATING DEVICE.

Application filed May 1, 1923. Serial No. 635,886.

This invention relates to translating devices, and has for its object to vary the intensity of a beam of light in response to variations in an electric current.

This object is attained by providing, in combination with a light source, a light valve comprising a pair of electrical conductors arranged in a plane at right angles to a magnetic field so as to define a slot through which the light is transmitted. Varying electrical currents are supplied to said conductors to cause a movement of said conductors relative to each other, thus varying the width of the slot and the amount of light transmitted.

This invention may be utilized, for example, to record sound on a photographic film by passing current through the conductors of the light valve, and controlling said current by sound waves to cause variations in the width of the slot thereby varying the intensity of light transmitted through the slot. This light may be focussed on a continuously moving film to produce a series of striations of varying densities.

Figure 1:
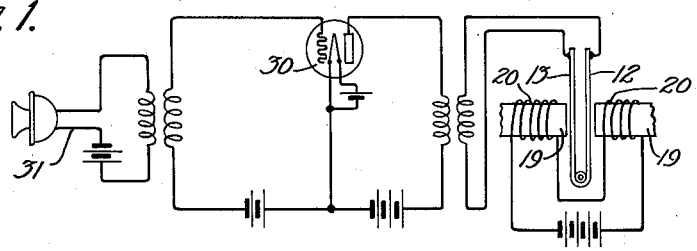
Figure 5:
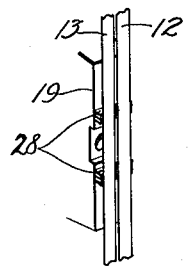

Referring now to the drawings, wherein the invention is disclosed as adapted for recording speech on a photographic film. Fig. 1 discloses an electric circuit by means of which the position of the conducting members may be varied, Fig. 2 is a diagrammatic view of a lens system for transmitting light from a light source to a film, Fig. 3 is a perspective view partially in section of the light valve, Fig. 4 is a section on the line 4—4 of Fig. 3 and Fig. 5 is a detail of the valve.

Figure 2:
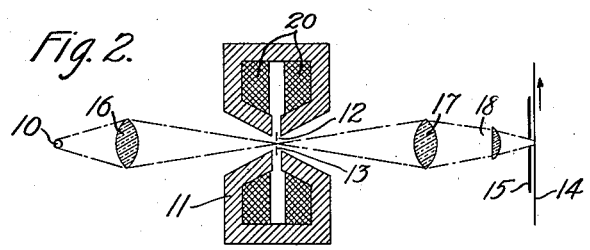

Referring first to Fig. 2, 10 is a source of light, 11 is a light valve comprising a pair of relatively movable members 12 and 13 defining a slot through which light from the source 10 may pass, 14 is a photographic film upon which is to be made a sound record and 15 is a shield having a narrow slot therein through which light passes to the film 14, adapted to be moved past the slot. A lens 16 is provided to focus the image of light source 10 on the slot defined by the members 12 and 13 and the lenses 17 and 18 serve to focus the image of the slot on the film 14. The members 12 and 13 are arranged within an electromagnetic field in a plane perpendicular thereto and their position relative to each other varied by the passage of alternating current through them in a manner to be hereinafter described, so that the intensity of the light transmitted to the film 14 is varied to form a series of striations of varying exposures thereon.

Figure 3:
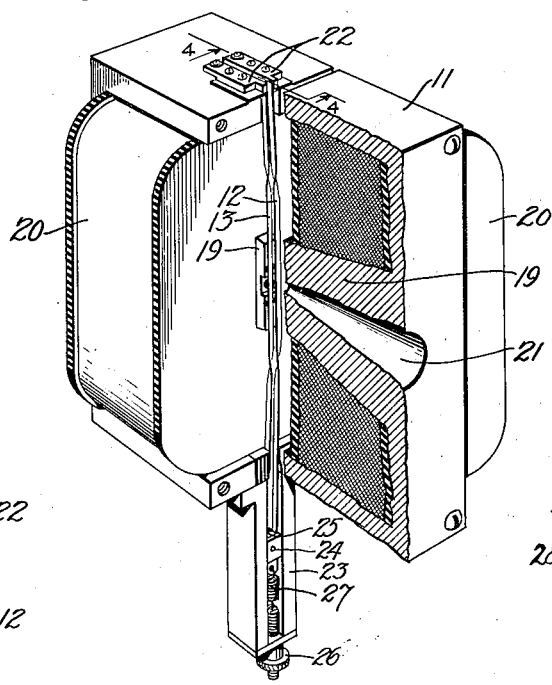
Figure 4:
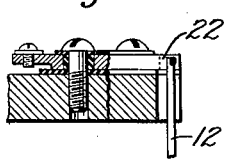

Referring now to Fig. 3, the light valve 11 comprises a two-part metallic frame, each part having a core 19 on which is supported the field winding of an electromagnet 20. In each of the cores or pole pieces 19 is provided an axial aperture 21 diverging outwardly. The adjacent faces of the electromagnets 20 and the pole pieces 19 are spaced slightly apart to provide an air gap, the purpose of which will appear later. In the upper face of one part of the frame is an insert of insulating material to which are attached a pair of contact members 22 and on the bottom face of the frame there is provided a metallic post 23 having a longitudinally extending slot. Arranged to slide in the slot is a block 24 in which is supported a pulley 25, either the block or the pulley being of insulating material. In the upper end of the post 23 is arranged a slidably mounted threaded rod 26 which is adjustable by the nut 26ª. Between the inner end, the rod 26 and the block 24 is provided a spring 27 attached to both the screw and the block. A metallic conducting ribbon is arranged between the electromagnets 20 with its ends connected to the contact members 22 and is passed over the pulley 25 to provide two parallel strands between the adjacent ends of the apertures 21. The strands of the ribbon are twisted so that they lie in a plane at right angles to the axis of the apertures 21 and constitute the members 12 and 13 which determine the slot through which light is transmitted from the source 12 to the film 14. At opposite sides of the apertures 21 there are provided on one of the pole pieces, a pair of bridges 28 of insulating material to serve as supports for the members 12 and 13 to prevent contact thereof with the pole pieces and also to serve to keep the members 12 and 13 midway between the pole pieces.

In Fig. 1 is disclosed a circuit by means of which the position of these wires relative to each other may be varied in accordance with sound waves so that the variations recorded on the film will constitute a sound record. There is provided a vacuum tube amplifier circuit 30, the input circuit of which is inductively connected with a telephone circuit 31 and the output circuit of which is preferably inductively connected to a circuit including the metallic ribbon constituting the members 12 and 13, these members being arranged in the field of the electromagnets 20. When sound waves are impressed on the telephone circuit, alternating currents are developed in the output circuit of the vacuum tube amplifier, thereby inducing alternating currents in the circuit including the members 12 and 13. The arrangement of wires 12 and 13 is such that the current necessarily flows through them in opposite directions, thereby causing them to be moved toward or away from each other under the influence of the field developed by the electromagnets 20.

To utilize this device in the making of a sound record, the members 12 and 13 are set relative to each other so that when at rest, they transmit an average amount of light. Sound waves are impressed on the telephone circuit 3 and the film 14 moved in the direction of the arrow. As the members 12 and 13 vibrate in response to currents passing therethrough, the amount of the light transmitted to the film 14 is varied thus resulting in the exposure of the film to light striations of varying intensities. This film may then be developed in the usual photographic manner to produce a series of striations of varying densities which combine to form a record of the sound delivered to the telephone circuit.

To obtain a uniform response, the natural frequency of the members 12 and 13 should be higher than the frequency of the currents passing through them. The natural frequency of the members 12 and 13 may be varied by adjusting the tension thereon through the medium of the rod and nut 26 and 26ª, so as to accommodate the device to different frequencies.

The device of this application is capable of complete modulation of the light transmitted from the source 10 to the film 14 since an overload of current in a direction tending to close the slot will merely bring the members 12 and 13 into contact and completely shut off the light or if the current is in the direction tending to open the slot, the members move outwardly to the full extent of their possible movement. There is, however, no possibility of excessive current resulting in a reversal of the intensity of the light.

It is, of course, understood that although this invention has been disclosed in connection with the making of photographic records of sound the invention is not limited thereto but may be utilized wherever it is desirable to modulate a beam of light.

What is claimed is:

1. In combination, a pair of parallel electrical conductors arranged in a magnetic field to define a light transmitting slot, means to project a beam of light upon said slot, and means for supplying electric current to said conductors to effect a variation in their space relation whereby the intensity of the beam of light transmitted through said slot is varied.

2. In combination, a pair of electrical conductors arranged to define a light transmitting slot, means for projecting a beam of light on said slot, an electromagnet surrounding said members, and means to supply current to said members to cause relative movement thereof whereby the intensity of the beam of light transmitted through said slot is varied.

3. In combination, a pair of parallel conductors arranged to define a light transmitting slot, means to project a beam of light on said slot, a magnetic field having its axis perpendicular to said conductors, and means for supplying electric current to said conductors to effect a variation in their space relation whereby the intensity of the beam of light transmitted through said slot is varied.

4. In combination, a pair of parallel conductors arranged in a magnetic field to define a light transmitting slot, means to project a beam of light upon said slot, and means to pass current through said conductors in opposite directions to effect a variation in their space relation whereby the intensity of the beam of light transmitted through said slot is varied.

5. A recording device comprising a photographic film, means for projecting a beam of light on said film, a pair of electrical conductors arranged to intercept the beam of light projected on the film, means for producing a magnetic field transverse to said conductors, and means for passing current through said conductors to vary the space relation thereof, whereby the intensity of the beam of light projected on said photographic film is varied.

6. A recording device comprising a photographic film, means for projecting a beam of light on said film, a pair of electrical conductors arranged to intercept the beam of light projected on the film, means for producing a magnetic field transverse to said conductors, and means for passing electrical current through said conductors in opposite directions to vary the space relation thereof, whereby the intensity of the beam of light projected on said photographic film is varied.

7. A recording device comprising a photographic film, means for projecting a beam of light on said film, a pair of electrical conductors arranged to intercept the beam of light projected on the film, means for producing a magnetic field transverse to said conductors, and means for passing alternating electric current through said conductors in opposite directions to vary the space relation thereof, whereby the intensity of the beam of light projected on said photographic film is varied.

8. A device for transmitting intelligence which comprises a pair of parallel conductors arranged to define a light transmitting slot, means for projecting a beam of light through said slot, means for varying the relative position of said conductors in response to electrical vibrations representing the intelligence to be transmitted whereby the intensity of the beam of light transmitted through said slot is varied, and means for recording said variations.

9. A device for recording sound waves which comprises a lens system for transmitting light from a light source to a photographic film, means for varying the intensity of the transmitted light comprising a pair of electrical conductors arranged in a magnetic field to define a light transmitting slot, a closed circuit including said conductors, a source of alternating current connected thereto, and means responsive to sound waves for controlling said alternating current source.

10. A device for recording sound which comprises a lens system for transmitting light from a light source to a film, means for varying the intensity of the light transmitted comprising a pair of electrical conductors arranged in the magnetic field to define a light transmitting slot, a vacuum tube generator circuit, a closed circuit including said electrical conductors inductively connected with the output circuit of said vacuum tube generator, and a telephone circuit inductively connected with the input circuit of said generator whereby the relative position of said conductors is varied in response to sound impressed on said telephone circuit.

11. A sound recording device comprising a photographic film, means for projecting a beam of light on said film, a light valve interposed between said means and said film, said valve comprising a pair of conductors arranged to define a light transmitting slot, and electrically operated means to effect a variation of the space relation of said members in response to said sound waves whereby the intensity of the beam of light transmitted to said film is varied.

12. A sound recording device comprising a photographic film, means for projecting a beam of light on said film, a light valve interposed between said means and said film, said valve comprising a pair of electrical conductors, arranged in a magnetic field to define a light transmitting slot, means for varying the space relation of said conductors whereby the intensity of the beam of light transmitted to the photographic film is varied, said means comprising a closed circuit including said conductors, a source of alternating current connected thereto, and means responsive to sound waves for controlling said alternating current source.

13. A sound recording device comprising a photographic film, means for projecting a beam of light on said film, a light valve interposed between said means and said film, said valve comprising a pair of electrical conductors arranged in a magnetic field to define a light transmitting slot, means for varying the space relation of said conductors whereby the intensity of the beam of light transmitted to the photographic film is varied, said means comprising a closed circuit including said conductors, a source of alternating current connected thereto, and a vacuum tube generator having its output circuit inductively connected to said closed circuit, and a telephone circuit inductively connected with the input circuit of said generator.

14. A light valve comprising a frame, a pair of aligned magnets supported by said frame, said magnets having aligned apertures, a pair of electrical conductors interposed between the adjacent faces of said magnets and traversing the ends of said apertures to define a light transmitting slot, and means for supplying current to said conductors to vary their space relation whereby the intensity of the light transmitted through said slot is varied.

15. A light valve comprising a frame, a pair of aligned magnets supported by said frame, said magnets having aligned apertures, a pair of flat conductors defining a light transmitting slot interposed between the adjacent faces of said magnets and traversing the ends of said apertures, the portions of said conductors adjacent said apertures lying in a plane at right angles to the axis of said apertures, and means for supplying current to said conductors to vary their space relation whereby the intensity of the light transmitted through said slot is varied.

16. A light valve comprising a frame, a pair of aligned magnets mounted therein, said magnets having aligned apertures, an electrical conductor interposed between the adjacent faces of said magnets, a pair of contact members carried by the frame for supporting the ends of said conductor adjacent each other, and a supporting member carried by the opposite side of said frame over which said conducting member passes, said conductor providing a pair of parallel portions adjacent said apertures to define a light transmitting slot, and means for supplying current to said conductor to vary the space relation of said portions whereby the intensity of the light transmitted through said slot is varied.

17. A light valve comprising a frame, a pair of aligned magnets mounted therein, said magnets having aligned apertures, an electrical conductor interposed between the adjacent faces of said magnets, a pair of contact members carried by the frame for supporting the ends of said conductor adjacent each other, and a resilient support carried by the opposite face of said frame over which said conductor is arranged, said conductor providing a pair of portions adjacent said apertures to define a light transmitting slot.

18. A light valve comprising a frame, a pair of aligned magnets supported therein, said magnets having aligned apertures, a movable supporting member carried by one face of said frame, a pair of stationary members carried by the other face, an electrical conductor interposed between the adjacent faces of said electromagnets, said electrical conductor passing over said adjustable support and having its ends attached to said stationary supports, whereby the two portions thereof define a light transmitting slot between the adjacent ends of the apertures in the magnets.

19. A light valve comprising a frame, a pair of aligned apertures, a post carried by one face of said frame, an adjustable member mounted in the end of said post, a resilient element carried thereby, a block attached to said resilient element, a pair of contact members on the opposite face of said frame, and an electrical conductor interposed between the adjacent faces of said magnets, said conductor being passed over said supporting block and having its ends attached to said contact member, whereby the two portions thereof define a light transmitting slot between the adjacent ends of the apertures in the magnets.

20. A light valve comprising a frame, a pair of aligned magnets carried thereby, said magnets having aligned apertures, a post carried by one face of said frame, an adjustable member mounted in the end of said post, a resilient element carried thereby, a block attached to said resilient element, a pair of contact members on the opposite face of said frame, and a flat conductor interposed between the adjacent faces of said magnets, said conductor being passed over said supporting block and having its ends attached to said contact members, the portions of said conductor adjacent the aperture through the magnets being in a plane at right angles to the axis of said apertures, whereby they define a light transmitting slot.

21. In combination, a light valve comprising a frame, a pair of aligned magnets supported by said frame, said magnets having aligned apertures, a pair of electrical conductors interposed between the adjacent ends of said apertures to define a light transmitting slot, means to project a beam of light on said slot, means to supply electric current to said conductors to vary their space relation, whereby the intensity of the beam of light transmitted by said slot is varied, and means for varying the tension on said electrical conductors.

22. A light valve comprising a frame, a pair of aligned magnets supported by said frame, said magnets having aligned apertures, a pair of flat electrical conductors interposed between the adjacent faces of said magnets and having the portions thereof adjacent the apertures arranged in a plane at right angles to the axis of said apertures to define a light transmitting slot, and means to vary the tension of said conductors.

23. An electric valve comprising a frame, a pair of aligned magnets carried by said frame, said magnets having aligned apertures, a pair of electrical elements interposed between the adjacent faces of said magnets to define a light transmitting slot between said apertures, and a pair of bridges carried by a face of one magnet at opposite sides of the aperture to support said conducting elements.

24. An electric valve comprising a frame, a pair of aligned magnets carried by said frame, said magnets having aligned apertures, a pair of electrical elements interposed between the adjacent faces of said magnets to define a light transmitting slot between said apertures, a pair of bridges carried by a face of one of said magnets at opposite sides of the apertures to support said conducting elements, and means to vary the tension of said conducting elements.

25. An electric valve comprising a frame, a pair of aligned magnets carried by said frame, said magnets having aligned apertures, a pair of electrical elements interposed between the adjacent faces of said magnets to define a light transmitting slot between said apertures, a pair of bridges carried by the adjacent faces of each magnet at opposite sides of the apertures to support said conducting elements, means for supplying alternating current to said conductors in opposite directions, and means for varying the natural frequency of said conductors.

26. An electric valve comprising a frame, a pair of aligned magnets carried by said frame, said magnets having aligned apertures, a pair of electrical elements interposed between the adjacent faces of said magnets to define a light transmitting slot between said apertures, a pair of bridges carried by the adjacent faces of each magnet at opposite sides of the apertures to support said conducting elements, means for supplying alternating current to said conductors in opposite directions in response to sound waves, to vary the relative position of said conductors, and means for varying the natural frequency of said conductors.

In witness whereof, I hereunto subscribe my name this 28th day of April, A. D. 1923.

EDWARD C. WENTE.